(12) United States Patent
Woodington

(10) Patent No.: US 11,975,844 B2
(45) Date of Patent: May 7, 2024

(54) AIRCRAFT SEAT UNIT

(71) Applicant: Safran Seats GB Limited, Cwmbran Wales (GB)

(72) Inventor: James Woodington, Cwmbran Wales (GB)

(73) Assignee: Safran Seats GB Limited, Cwmbran (GB)

( * ) Notice: Subject to any disclaimer, the term of this patent is extended or adjusted under 35 U.S.C. 154(b) by 393 days.

(21) Appl. No.: 17/254,721

(22) PCT Filed: Jun. 20, 2019

(86) PCT No.: PCT/GB2019/051735
§ 371 (c)(1),
(2) Date: Dec. 21, 2020

(87) PCT Pub. No.: WO2019/243827
PCT Pub. Date: Dec. 26, 2019

(65) Prior Publication Data
US 2021/0269163 A1   Sep. 2, 2021

(30) Foreign Application Priority Data

Jun. 21, 2018   (GB) .................................... 1810174

(51) Int. Cl.
*B64D 11/06* (2006.01)
(52) U.S. Cl.
CPC ...... *B64D 11/0644* (2014.12); *B64D 11/0601* (2014.12); *B64D 11/0636* (2014.12)
(58) Field of Classification Search
CPC ............ B64D 11/0601; B64D 11/0604; B64D 11/0639; B64D 11/064; B64D 11/0641; B64D 11/0643

(Continued)

(56) References Cited

U.S. PATENT DOCUMENTS 2,632,408 A    3/1953  Giles
3,572,829 A *  3/1971  Malitte ................. B64D 11/06
                                                  297/317

(Continued)

FOREIGN PATENT DOCUMENTS

EP    2803576 A1   11/2014
GB    2412310 A     9/2005

(Continued)

OTHER PUBLICATIONS

Europe Patent Application No. 19734475.7, Examination Report (Communication pursuant to Article 94(3) EPC), dated Jul. 8, 2022.

(Continued)

*Primary Examiner* — Michael H Wang
(74) *Attorney, Agent, or Firm* — Kilpatrick Townsend & Stockton LLP

(57) ABSTRACT

The present invention provides an aircraft seat unit comprising a main seat, and a companion seat, the main seat and the companion seat facing each other, wherein the companion seat comprises a seat pan, providing a seat pan surface, and a moveable seat element, the moveable seat element being moveable in relation to the seat pan between a stowed position, in which the companion seat provides an additional support surface for a main passenger in the main seat, and a deployed position, in which the moveable seat element provides a backrest surface for a companion passenger in the companion seat. The invention also provides a method of deploying and a method of stowing a companion seat.

28 Claims, 6 Drawing Sheets

(58) Field of Classification Search
USPC .......................................................... 297/124
See application file for complete search history.

(56) References Cited

U.S. PATENT DOCUMENTS

| | | | | |
|---|---|---|---|---|
| 5,310,243 | A * | 5/1994 | Pine ....................... | A47C 1/037 |
| | | | | 297/403 |
| 6,305,644 | B1 | 10/2001 | Beroth | |
| 7,681,945 | B1 | 3/2010 | Wiecek et al. | |
| 8,025,332 | B2 * | 9/2011 | Tsonev .................... | A47C 7/70 |
| | | | | 297/50 |
| 2005/0057081 | A1 * | 3/2005 | Kahn ..................... | B60N 2/305 |
| | | | | 297/331 |
| 2006/0097553 | A1 * | 5/2006 | Spurlock ................ | B64D 11/06 |
| | | | | 244/118.6 |
| 2006/0226670 | A1 * | 10/2006 | Bernstein ................ | B60R 11/02 |
| | | | | 296/64 |
| 2007/0252404 | A1 * | 11/2007 | Muck .................. | B60N 2/3065 |
| | | | | 296/65.16 |
| 2009/0146005 | A1 * | 6/2009 | Bettell ............... | B64D 11/0643 |
| | | | | 244/118.6 |
| 2009/0302158 | A1 * | 12/2009 | Darbyshire .......... | B64D 11/064 |
| | | | | 244/118.6 |
| 2013/0113250 | A1 * | 5/2013 | Udriste .............. | B64D 11/0643 |
| | | | | 297/217.3 |
| 2013/0200668 | A1 * | 8/2013 | Michalak ................. | B60N 2/06 |
| | | | | 297/341 |
| 2013/0248653 | A1 | 9/2013 | Round et al. | |
| 2018/0050803 | A1 * | 2/2018 | Le ......................... | B60N 2/838 |

FOREIGN PATENT DOCUMENTS

| | | | | |
|---|---|---|---|---|
| GB | | 2433433 A | 6/2007 | |
| GB | | 2438162 A * | 11/2007 | ............. B64D 11/06 |
| WO | WO-2015155687 A1 * | 10/2015 | ............... B60N 2/34 |

OTHER PUBLICATIONS

PCT/GB2019/051735, International Search Report and Written Opinion, dated Oct. 1, 2019, 13 pages.
GB1810174.1, Search Report, dated Nov. 30, 2018, 3 pages.
Chinese Application No. 2019800412089, Second Office Action, dated Sep. 12, 2023.
China Patent Application No. 2019800412089, First Office Action and Search Report, dated Apr. 13, 2023.

* cited by examiner

AIRCRAFT SEAT UNIT

BACKGROUND OF THE INVENTION

The present disclosure relates to aircraft seat units.

The present invention concerns aircraft seat units for providing seating to one or more passengers in an aircraft. More particularly, but not exclusively, this invention concerns an aircraft seat unit comprising a main seat, and a companion seat, the main seat and the companion seat facing each other, wherein the companion seat comprises a seat pan, providing a seat pan surface. The invention also concerns a method of deploying and a method of stowing a companion seat.

Many prior art aircraft seat units exist and many of them, in particular those designed for use in first or business class, comprise a main passenger seat and a companion seat that can also be used as an ottoman/foot rest or part of a bed surface of the main seat. An example can be seen in GB 2412310.

However, in these arrangements, the companion seat can be uncomfortable to sit on, especially for long periods of time. For example, a second passenger may not wish to sit in the companion seat to share a meal with a passenger in the main seat as the companion seat may not be comfortable enough.

The present invention seeks to mitigate the above-mentioned problems. Alternatively or additionally, the present invention seeks to provide an improved aircraft seat unit.

SUMMARY OF THE INVENTION

The present invention provides, according to a first aspect, an aircraft seat unit comprising a main seat, and a companion seat, the main seat and the companion seat facing each other, wherein the companion seat comprises a seat pan, providing a seat pan surface, and a moveable seat element, the moveable seat element being moveable in relation to the seat pan between a stowed position, in which the companion seat provides an additional support surface for a main passenger in the main seat, and a deployed position, in which the moveable seat element provides a backrest surface for a companion passenger in the companion seat.

Having a moveable seat element allows a backrest surface to be provided for a passenger in the companion seat (when deployed). This makes the companion seat much more comfortable and a companion passenger may sit in the companion seat for longer. Ideally, the companion seat may offer a level of comfort comparable to the companion passenger's designated seat or the main seat. When the moveable seat element is stowed it provides an additional support surface, such as a foot or leg rest, for the main passenger in the main seat. Hence, the moveable seat element is dual use.

Preferably, the main seat is convertible between a seat configuration and a bed configuration and wherein, when the moveable seat element is in the stowed position, the additional support surface provided is an additional bed support surface for the main passenger. This allows a further use for the companion seat as a bed surface for the main passenger in the main seat (when the main seat is in its bed configuration). The bed surface may be a foot-end bed surface.

Preferably, the seat pan surface is (at least partially) covered by the moveable seat element when the moveable seat element is in its stowed position. Preferably, the seat pan surface is uncovered when the moveable seat element is in its deployed position.

Preferably, the seat pan surface and backrest surface are substantially the same size and/or shape. For example, less than 50% (or 25%, or 10%, or substantially 0%) of both of the seat pan surface and the backrest surface are exposed when the movable seat element is in the stowed position. In other words, at least 50% (or 75%, or 90%, or substantially 100%) of the seat pan surface is covered by the movable seat element and at least 50% (or 75%, or 90%, or substantially 100%) of the backrest surface lies against the seat pan surface, when the movable seat element is in its stowed position.

Preferably, the moveable seat element is slidable and/or rotatable with respect to the seat pan. This allows the moveable seat element to be effectively moved in relation to the seat pan. The moveable seat element may slide (for example sliding sideways in relation to the seat pan or up and down in relation to the seat pan), rotate up from behind the seat pan or rotate up from the seat pan.

More preferably, the moveable seat element is rotatable with respect to the seat pan. This provides an effective deployment/stowage action that is easy for a passenger to operate.

Even more preferably, the moveable seat element is rotatable about a rotation axis adjacent, and preferably along, a rear edge of the moveable seat element. This allows the moveable seat element to be flipped up to be deployed.

In the context of the invention, "rear" and "front" (and forwards and backwards/rearwards) are in relation to conventional orientation of the relevant seat. i.e. the front of the seat is towards the direction of a passenger/the seat faces and the rear is towards the direction the passenger/the seat faces away from. As the companion seat is facing the main seat (i.e. the front edge of the companion seat is nearest the main seat), the rear edge is the edge furthest away from the main seat.

Even more preferably, the rotation axis is also adjacent, and preferably along, a rear edge of the seat pan surface. This allows the moveable seat element to be flipped up to be deployed, in relation to the seat pan surface. This means the seat pan surface may be covered when the moveable seat element is stowed. This prevents damage to the seat pan surface, for example, caused by feet/legs of a passenger of the main seat.

Even more preferably, the seat pan surface is upwardly facing and is angled so that a front edge of the seat pan surface is higher than the rear edge of the seat pan surface. This provides a seat pan that is angled backwards (in relation to conventional orientation of the companion seat). This means that the passenger is secure in the seat with reduced risk of falling forwards out of the companion seat. For example, the seat pan surface may be angled backwards (so as to be higher at the front of the seat pan) at an angle of 3 to 14 degrees relative to an aircraft floor upon which the companion seat is to be mounted upon. Preferably, the seat pan surface angle is between 5 and 14 degrees and more preferably between 10 and 14 degrees.

Even more preferably, when the moveable seat element is in the stowed position, the backrest surface is downwardly facing and is correspondingly angled so as to lie against the seat pan surface. This allows a compact stowed arrangement (the backrest surface can be coplanar with the seat pan surface). It also allows for the backrest surface, when the moveable seat element is deployed, to be at a reclined angle, so as to provide additional comfort to the companion passenger.

Even more preferably, when the moveable seat element is in the stowed position, the additional support surface is upwardly facing and is substantially horizontal. This allows for the additional support surface, such as a bed surface and/or foot/leg rest surface, to be in line with the angle of the main seat and provide an effective additional support surface. Substantially horizontal may mean that the surface is substantially parallel to an aircraft floor. It also includes being at an angle of approximately 3 degrees to an aircraft floor so that the surface is substantially horizontal during flight of an aircraft.

Preferably, the seat pan surface is a size suitable for a companion passenger to sit on. For example, the seat pan surface has a depth, between the front and rear edges, of at least 250 mm. More preferably, the seat pan surface has a depth of at least 350 mm. Even more preferably, the seat pan surface has a depth of at least 400 mm. Preferably, the movable seat element is rotatable about a rotation axis, with respect to the seat pan and wherein the rotation axis is adjacent the rear edge of the seat pan surface.

The backrest surface and additional support surface may be non-co-planar and/or non-parallel. The backrest surface may provide a reclined backrest when the additional support surface is substantially vertical.

The backrest surface may provide a reclined backrest, when the additional support surface is substantially vertical (at 90 degrees), of between 93 and 114 degrees, and preferably between 104 and 114 degrees. Hence, the angle between the backrest surface and the additional support surface is between 3 degrees and 24 degrees, and preferably between 14 and 24 degrees. In an example, where the seat pan surface is at an angle of 3 degrees relative to an aircraft floor upon which the companion seat is to be mounted upon, and the angle between the backrest surface and the additional support surface is 3 degrees, the additional support surface is substantially horizontal (relative to the aircraft floor) when the backrest surface lies flush against the seat pan surface. This also provides a backrest recline angle of 93 degrees (relative to horizontal/aircraft floor), at an angle of 90 degrees to the seat pan surface. In another example, where the seat pan surface is at an angle of 14 degrees relative to an aircraft floor upon which the companion seat is to be mounted upon, and the angle between the backrest surface and the additional support surface is 14 degrees, the additional support surface is substantially horizontal (relative to the aircraft floor) when the backrest surface lies flush against the seat pan surface. This also provides a backrest angle of 104 degrees (relative to horizontal/aircraft floor), at an angle of 90 degrees to the seat pan surface. In another example, where the seat pan surface is at an angle of 14 degrees relative to an aircraft floor upon which the companion seat is to be mounted upon, and the angle between the backrest surface and the additional support surface is 24 degrees, the additional support surface is 10 degrees off horizontal (relative to the aircraft floor) when the backrest surface lies flush against the seat pan surface. This also provides a backrest angle of 114 degrees (relative to horizontal/aircraft floor), at an angle of 100 degrees to the seat pan surface.

The aircraft seat unit may comprise a table in between the main seat and the companion seat. This allows for two passengers in the two seats to eat together from the same table or do work together using the table.

Preferably, the seat pan is moveable in relation to a companion seat support structure between a rear position at a first distance from the main seat and a forward position at a second, shorter distance from the main seat. This allows a passenger in the companion seat to be seated nearer a main passenger in the main seat. Hence, an appropriate distance for dining or working (with a table provided between the two seats) can be provided.

More preferably, the moveable seat element and the seat pan are linked such that movement of one of the moveable seat element and the seat pan causes movement of the other of the moveable seat element and the seat pan. This allows for combined movement of the moveable seat element and of the seat pan, which makes deployment/stowage of the moveable seat element and movement of the seat pan easier.

Even more preferably, movement of the moveable seat element causes movement of the seat pan and/or movement of the seat pan causes movement of the moveable seat element. This means that a passenger moving one of the seat pan and moveable seat element does not have to physically move the other in order for it to move.

For example, backwards (rearwards) movement of the seat pan may cause stowage of the moveable seat element. For example, forwards movement of the seat pan may cause deployment of the moveable seat element. For example, stowage movement of the moveable seat element may cause backwards (rearwards) movement of the seat pan. For example, deployment movement of the moveable seat element may cause forwards movement of the seat pan. Of course, any combination of the above examples are possible.

Preferably, the additional support surface has a first firmness and the seat pan surface has a second, different firmness. This allows a first firmness to be provided that is most suitable for use as a bed and/or foot/leg rest surface and a second, different firmness to be provided that is most suitable for a seat pan surface. The second firmness may be lower (less firm) than the first firmness.

The backrest has a firmness that may be different to the firmness of the seat pan and/or additional support surface. This allows a backrest firmness to be provided that is most suitable for use as a back rest surface.

Preferably, the seat pan surface is a cushioned surface.

Preferably, the companion seat comprises at least one moveable arm rest moveable in relation to the moveable seat element between a stowed position and a deployed position, in which the companion seat provides an arm rest support surface for the companion passenger. This makes the companion seat even more comfortable. Having a moveable arm rest that can be stowed also enables a compact stowage arrangement. There may be two moveable arm rests provided; one on either side of the companion seat. The arm rest(s) may not be moveable when the moveable seat element is stowed. The arm rest(s) may be moveable when the moveable seat element is deployed.

The arm rest surface has a firmness that may be different to the firmness of the seat pan and/or backrest and/or additional support surface. This allows an arm rest firmness to be provided that is most suitable for use as an arm rest surface.

Even more preferably, the moveable arm rest is rotatable with respect to the moveable seat element. This provides a deployment/stowage action that is easy and intuitive for a passenger to operate.

Even more preferably, the moveable arm rest is rotatable about a rotation axis adjacent, and preferably along, a rear edge of the moveable arm rest. This provides a large area of arm rest surface. As the companion seat is facing the main seat (i.e. the front edge of the companion seat is nearest the main seat), the rear edge of the moveable arm rest is the edge furthest away from the main seat.

Even more preferably, the rotation axis is also adjacent, and preferably along, the backrest surface. This allows the arm rest to be effectively deployed in relation to the back rest.

Preferably, in the stowed position, the moveable arm rest lies substantially flush with the backrest surface. This enables a passenger to sit in the companion seat with the arm rest stowed and have a wide back rest surface to rest against. It also provides a compact stowage arrangement. This is because the moveable seat element can lie flush against the seat pan surface when stowed.

Preferably, the arm rests(s) abut against a portion of the moveable seat element when the arm rest(s) are in the deployed position. This prevents the arm rest(s) lowering further than substantially horizontal, or any other desired deployment angle.

Preferably, the companion seat comprises at least one moveable head rest moveable in relation to the moveable seat element between a stowed position and a deployed position, in which the companion seat provides a head rest support surface for the companion passenger. This provides even more comfort for a companion passenger. It also may provide protection for a TV monitor or other equipment behind the head rest support surface. The head rest may not be moveable when the moveable seat element is stowed. The head rest may be moveable when the moveable seat element is deployed.

The moveable head rest may be rotatable about a rotation axis along a lower edge of the moveable head rest. This provides a large area of head rest surface. The rotation axis may also be along the backrest surface, for example an upper edge of the backrest surface. This allows the head rest to be effectively deployed in relation to the back rest.

In the stowed position, the moveable head rest may lie substantially flush with the backrest surface. This enables a passenger to sit in the companion seat with the head rest stowed and have a large back rest surface to rest against. It also provides a compact stowage arrangement. This is because the moveable seat element can lie flush against the seat pan surface when stowed.

Preferably, the seat pan of the companion seat is moveable up and down so the height of the additional support surface provided and/or the height of the seat pan surface varies relative to a height of the main seat. This allows the companion seat to be put at a suitable height for use as an additional support surface as well as a suitable height for a seat pan surface for a companion passenger. The companion seat may move on guide rails mounted on a shell or console of the aircraft seat unit. A support structure of the companion seat may also be moveable up and down with the seat pan.

Preferably, the companion seat comprises a storage container under the moveable seat element. This provides additional storage space for the main or companion passenger, for example for shoes or slippers. The storage container may be open. Alternatively, the storage container may comprise a closing mechanism, such as a rotatable door or a slidable drawer.

Preferably, the companion seat comprises a seat belt for use by the companion passenger. This allows the companion passenger to sit in the companion seat during flight (for example, during turbulence) and also, possibly during taxi, take-off and landing (TTL).

Preferably, movement of the moveable seat element between the stowed and deployed positions is mechanically and/or electrically actuated. This allows for efficient stowage/deployment of the moveable seat element.

There may be a handle or button that may be used to initiate or control actuation of the deployment/stowage.

There may be a latch that needs to be unlatched to allow the deployment and/or stowage movement to occur.

According to a second aspect of the invention there is also provided a method of deploying a companion seat, the method comprising the steps of providing an aircraft unit with a main seat and the companion seat, the main and companion seats facing each other, moving a moveable seat element of the companion seat in relation to a seat pan, providing a seat pan surface of the companion seat, from a stowed position, in which in which the companion seat provides an additional support surface for a main passenger in the main seat, and a deployed position, in which the moveable seat element provides a backrest surface for a companion passenger in the companion seat.

According to a third aspect of the invention there is also provided a method of stowing a companion seat, the method comprising the steps of providing an aircraft unit with a main seat and the companion seat, the main and companion seats facing each other, moving a moveable seat element of the companion seat in relation to a seat pan, providing a seat pan surface of the companion seat, from a deployed position, in which the moveable seat element provides a backrest surface for a companion passenger in the companion seat and a stowed position, in which the companion seat provides an additional support surface for a main passenger in the main seat.

It will of course be appreciated that features described in relation to one aspect of the present invention may be incorporated into other aspects of the present invention. For example, the methods of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
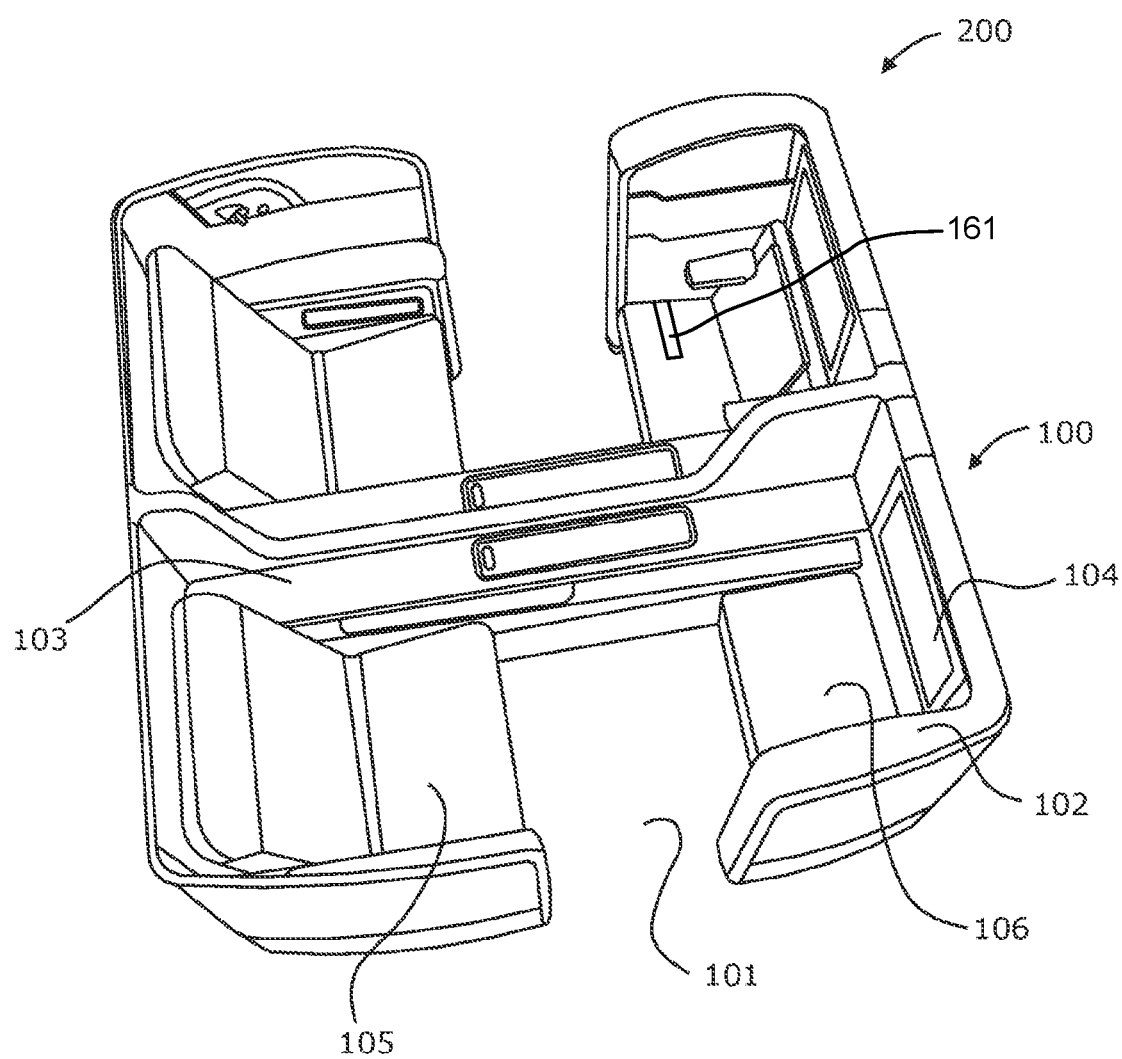
FIG. 1 shows a perspective downwards looking view of a double aircraft seat unit including two single aircraft seat units, both according to a first embodiment of the invention.

FIG. 1 shows a perspective downwards looking view of a double aircraft seat unit 200 including two single aircraft seat units 100, both according to a first embodiment of the invention.

Each aircraft seat unit 100 sits above a floor 101 and comprises a privacy shell 102 that surrounds a side console 103, main seat 105 and a companion seat 106. The main seat 105 and the companion seat 106 face each other, with the console 103 to one side of the seats 105, 106 and an accessway (a gap in the privacy shell 102) on the other side of the seats 105, 106. On the inside of the privacy shell 102, behind the companion seat 106 is a TV monitor 104 for viewing by a passenger in the main seat 105.

In FIG. 1, the aircraft seat unit 100 at the top of the Figure has the companion seat 106 in a deployed configuration, where a companion passenger can sit on it and have a backrest provided. The other aircraft seat unit 100 (at the bottom of the Figure) has the companion seat 106 in a stowed configuration where it is used as an ottoman for the main seat 105.

Figure 5:
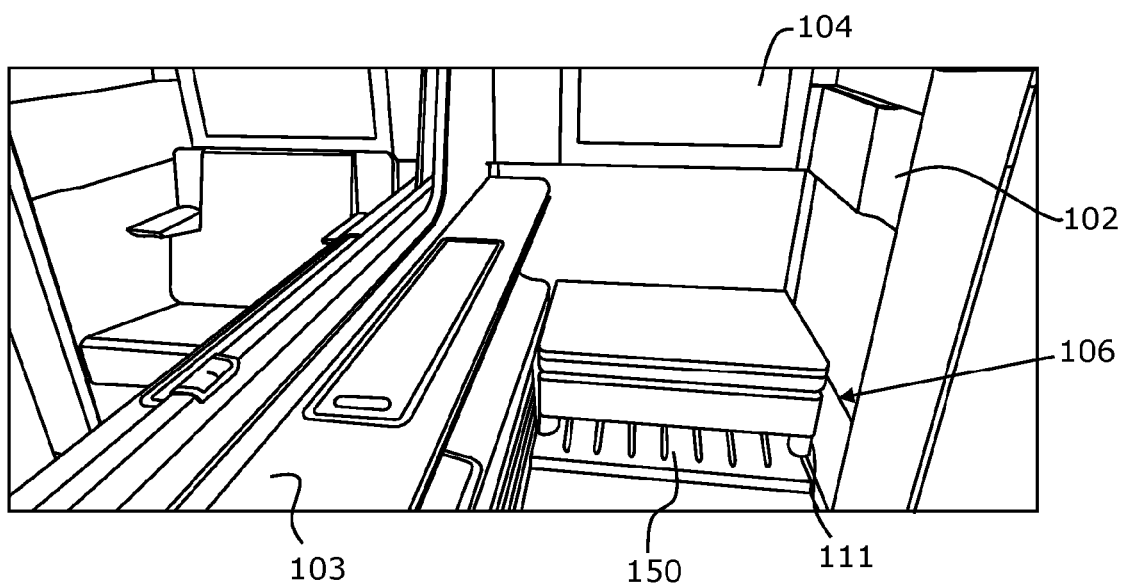
FIG. 5 shows a perspective rear view of part of one of the aircraft seat units of FIG. 1, showing a front view of the companion seat, with the moveable seat element in the stowed configuration.

As shown in FIG. 5, which is a perspective rear view of part of one of the aircraft seat units 100 of FIG. 1, the companion seat 106 comprises a support structure 111 that supports the rest of the companion seat 106. The support structure 111 also provides a storage container 150 under the rest of the companion seat 106.

Figure 2A:
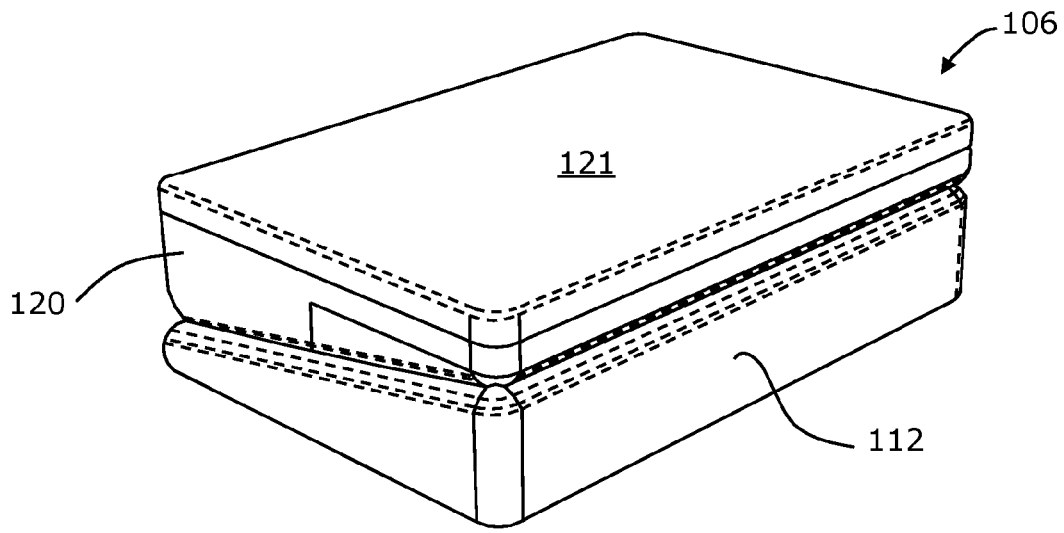
FIG. 2a shows a schematic view of a companion seat of one of the single aircraft seat units, the companion seat having a moveable seat element in a stowed configuration.

FIG. 2a shows a schematic view of the companion seat 106 (excluding the support structure 111). The companion seat 106 comprises a seat pan 112 and a moveable seat element 120 pivotally mounted to flip up in relation to the seat pan 112. In FIG. 2a, the moveable seat element 120 is in a stowed position (laying on top of the seat pan 112). In this position, an upwards facing surface 121 of the moveable seat element 120 provides a foot/leg rest surface, so as to provide an ottoman function for the main seat 105. If the main seat 105 was in a bed configuration, the surface 121 of the moveable seat element 120 may be used to make up part of the bed surface of the bed provided.

Figure 2B:
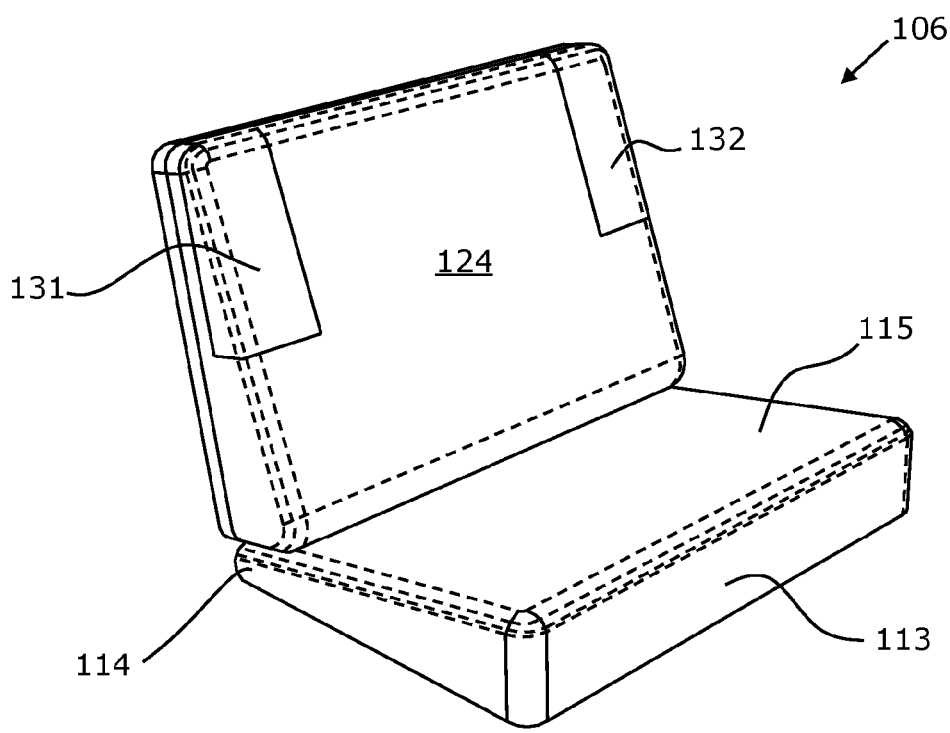
FIG. 2b shows a schematic view of the companion seat of FIG. 2a, the moveable seat element being in a deployed configuration.

FIG. 2b shows a schematic view of the companion seat of FIG. 2a, with the moveable seat element 120 in a deployed configuration, so that it has been flipped up to provide a backrest for the companion seat 106. More particularly, the previously downwardly facing surface of the moveable seat element 120 (opposite to surface 121) provides a slightly reclined backrest surface 124.

In this configuration, it is easier to see other features of the seat pan 112. The seat pan 112 has an upwardly facing (although actually slightly angled backwards) seat pan surface 115, a front edge 113 and a rear edge 114.

Figure 2C:
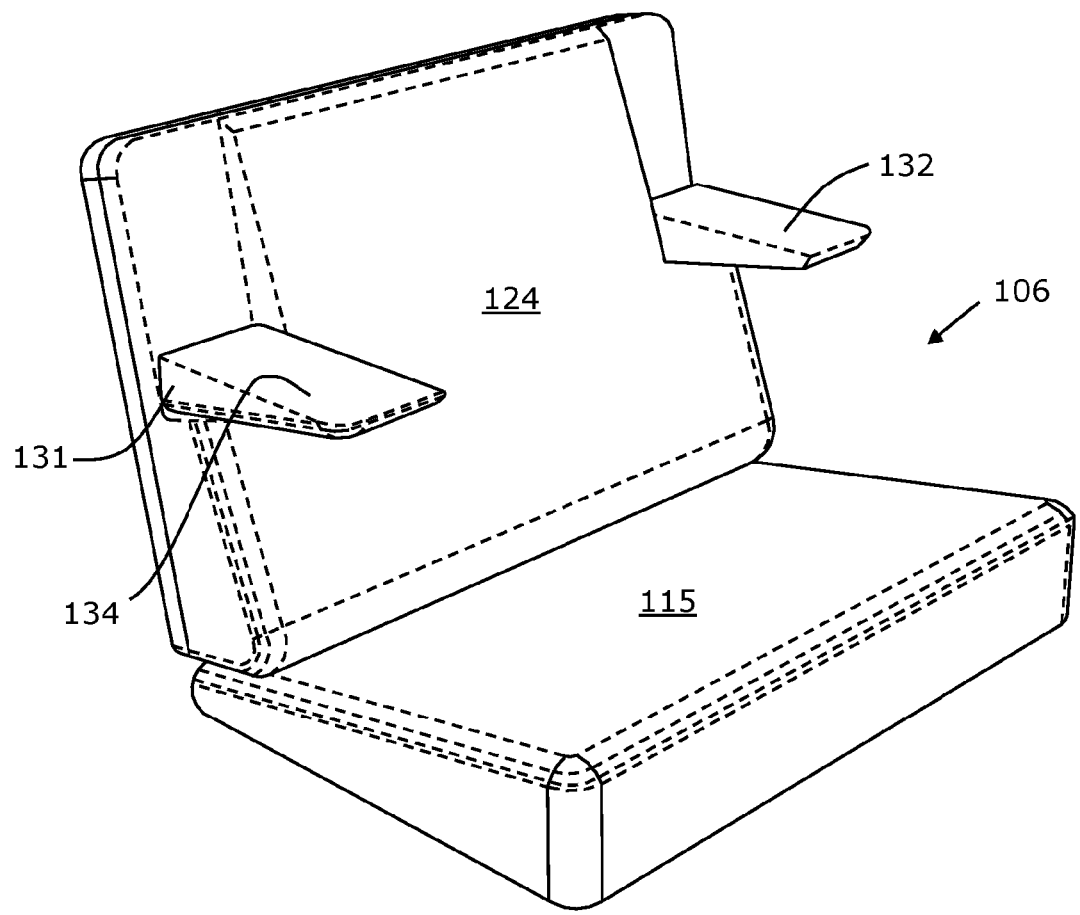
FIG. 2c shows a schematic view of the companion seat of FIGS. 2a and 2b, the moveable seat element being in a deployed configuration and the companion seat having two arm rests in their deployed configurations.

FIG. 2c shows a schematic view of the companion seat of FIGS. 2a and 2b, with the moveable seat element 120 in the deployed configuration. Here, two arm rest 131, 132 (one on either side of the backrest surface 124) have been flipped down to provide an arm rest surface 134. Comparing FIGS. 2b and 2c, it can be seen that in their stowed positions (As in FIG. 2b), the arm rests 131, 132 sit flush with the backrest surface 124.

Figure 3A:
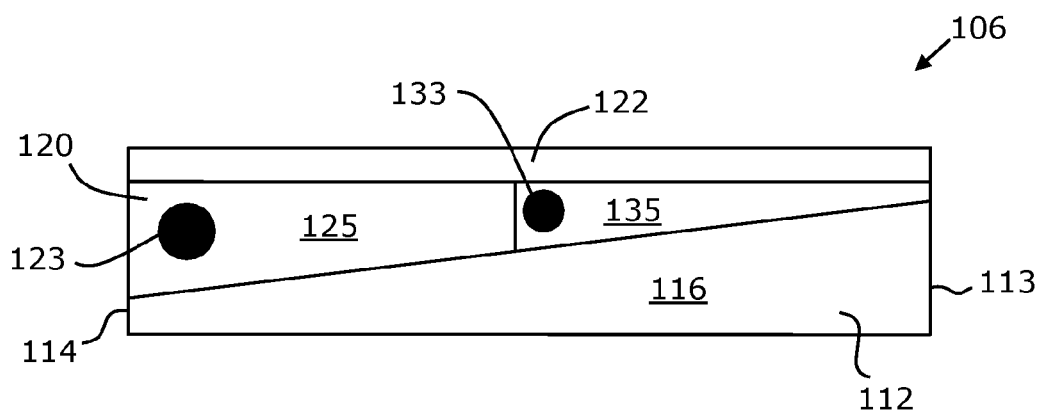
FIG. 3a shows a side schematic view of the companion seat of FIGS. 2a to 2c, with the moveable seat element in the stowed configuration.

FIG. 3a shows a side schematic view of the companion seat of FIGS. 2a to 2c, with the moveable seat element 120 in the stowed configuration. Here, the shape of the different parts of the companion seat 106 can more easily be seen. The seat pan 112 comprises a shaped wedge cushion 116 with the front edge 113 being longer and extending higher than the rear edge 114. All of the cushioning is made of a graphite combustion modified high resilient polyurethane foam for use in aircraft seating, e.g. DAX® foams of varying density, provided by MGR Foamtex. The cushion 116 is provided with a density suitable for use as a seat pan. This is a density of approximately 57-66 kg/m³.

The moveable seat element 120 is also a wedge shape with its rear edge (as shown in FIG. 3a) being longer and extending further downwards than its front edge. This means that the moveable seat element 120 and seat pan 112 make up a rectangle profile, when the moveable seat element 120 is in this stowed position.

The moveable seat element 120 has an upper cushion layer 122 that provides the foot/leg/bed surface and a lower wedged cushion 125 that provides the backrest cushioning/surface. These cushions 122, 125 may be made of foam (or any other material) with different densities, and provide a different firmness. For example, the cushion 122 is provided with a density suitable for use as a foot/leg rest/bed surface. This is a density of approximately 60-66 kg/m³. The cushion 125 is provided with a density suitable for use as a backrest. This is a density of approximately 43-57 kg/m³. 123 marks the pivot point of the moveable seat element 120 with respect to the seat pan 112.

The cushioning 135 for the arm rest 131 can also be seen in this Figure and the pivot point 133 about which the arm rest pivots with respect to the moveable seat element 120. The cushion 135 is provided with a density suitable for use as an arm rest surface. This is a density of approximately 43-66 kg/m³. The armrests 131, 132 are deployed/stowed by flipping down/up in resistance to a friction hinge.

Figure 3B:
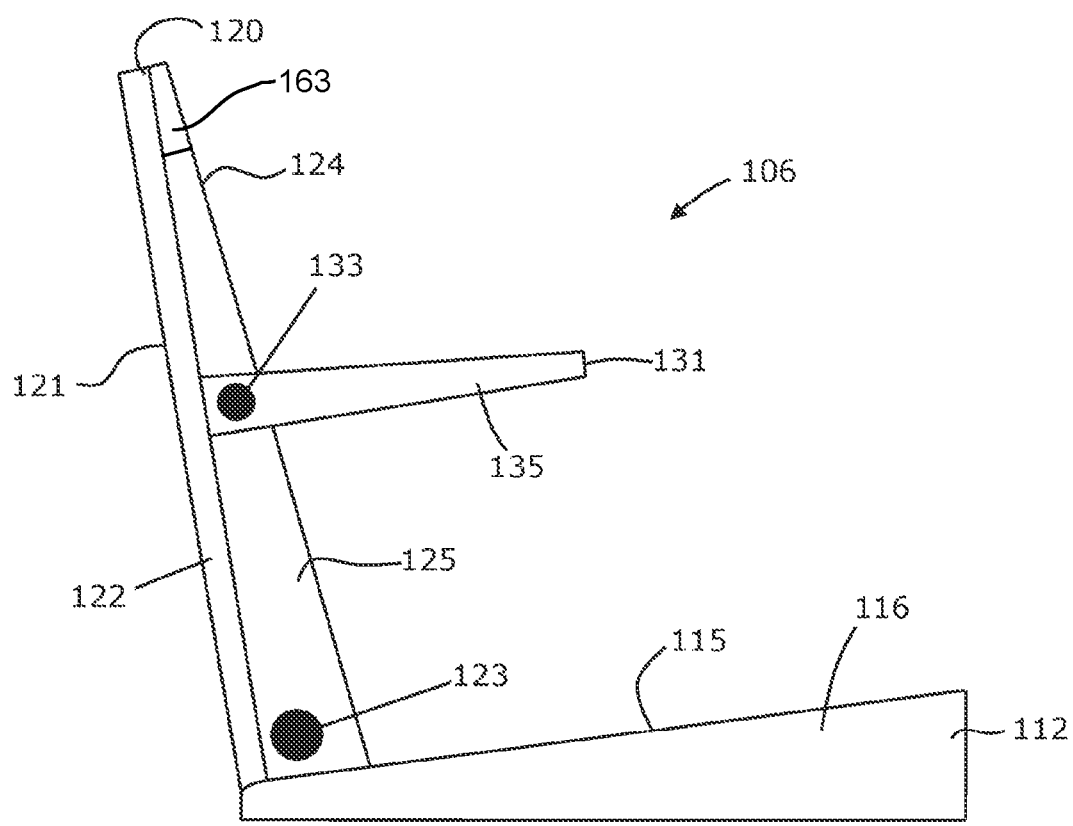
FIG. 3b shows a side schematic view of the companion seat of FIGS. 2a to 2c, with the moveable seat element in the deployed configuration and the two arm rests in their deployed configurations.

FIG. 3b shows a side schematic view of the companion seat 106 of FIGS. 2a to 2c, with the moveable seat element 120 in the deployed configuration and the two arm rests 131, 132 in their deployed configurations. Here, it can be clearly seen that in the deployed configuration, the backrest surface 124 is reclined to provide a comfortable backrest for a passenger in the companion seat 106. In addition, the angle of the seat pan surface is slightly tilted back to also aid comfort of the companion passenger. As can be seen here, an underside of the arm rests 131, 132 is directly abutting/resting on the cushion 125, so preventing the arm rests 131, 132 falling below this position.

Figure 4A:
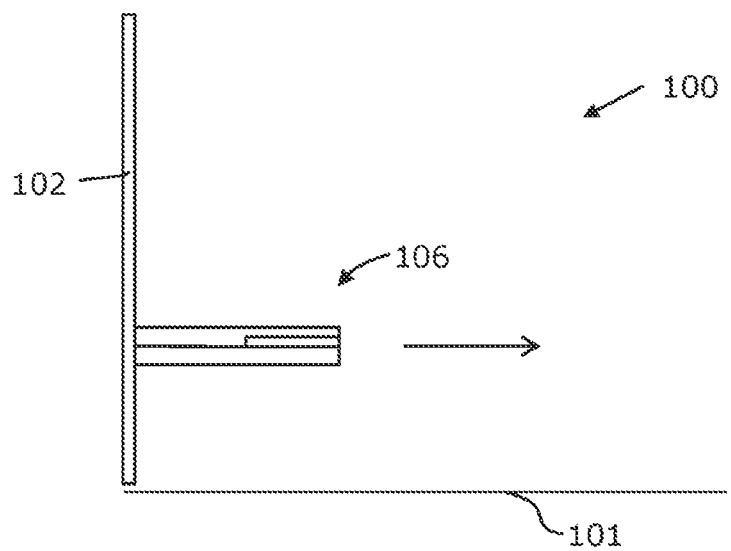
FIG. 4a shows a side schematic view of part of one of the aircraft seat units of FIG. 1, showing the companion seat of FIGS. 2a to 2c and FIGS. 3a and 3b, with the moveable seat element in the stowed configuration.

FIG. 4a shows a side schematic view of part of one of the aircraft seat units 100 of FIG. 1, showing the companion seat 106 with the moveable seat element 120 in the stowed configuration. In this position, the seat pan 112 and moveable seat element 120 abut against the privacy screen 102.

Figure 4B:
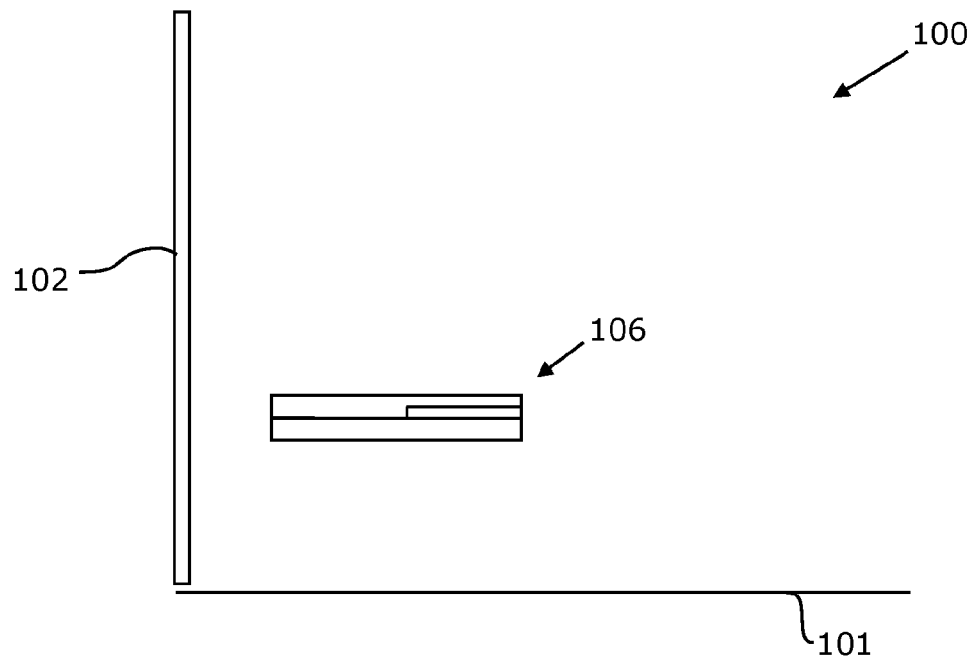
FIG. 4b shows a side schematic view like FIG. 4a, with the moveable seat element in the stowed configuration in a forwards position.
Figure 4C:
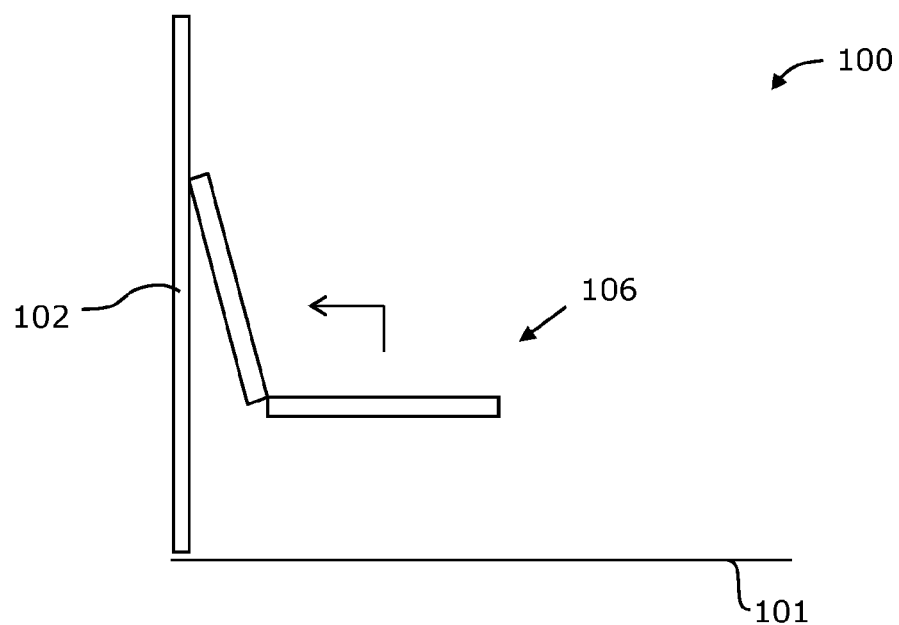
FIG. 4c shows a side schematic view like FIGS. 4a and 4b, with the moveable seat element in the deployed configuration in a forwards position.

The arrow shown shows that the seat pan 112 and moveable seat element 120 can slide forwards (i.e. towards the main seat 105), as shown in FIG. 4b. The moveable seat element 120 can be flipped up to the deployed configuration, as shown in FIG. 4c. The arm rests 131, 132 can be flipped down to be deployed, as shown in FIG. 4d.

Figure 4D:
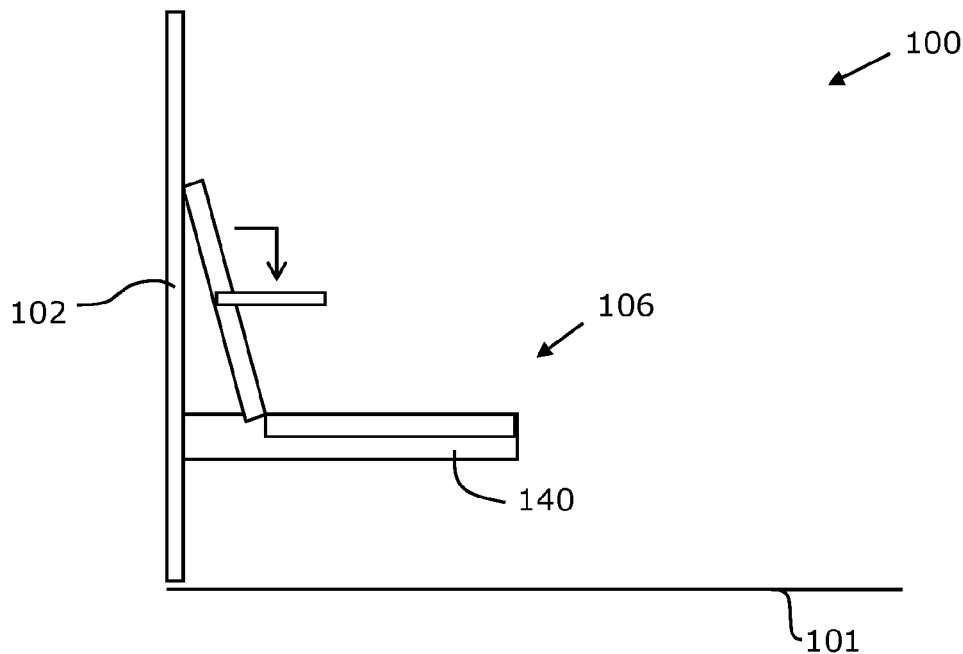
FIG. 4d shows a side schematic view like FIGS. 4a-4c, with the moveable seat element in the deployed configuration in a forwards position and with the two arm rests in their deployed configurations.

FIG. 4d also shows a tracking assembly 140 that is used to link the movement of the seat pan 112 and the moveable seat element 120 together. Hence, flipping up of the moveable seat element 120 (the movement from FIG. 4b to FIG. 4c) causes the seat pan 112 to slide forwards (the movement from FIG. 4a to FIG. 4b). Similarly, flipping down of the moveable seat element 120 causes the seat pan 112 to slide backwards.

The tracking assembly 140 comprises a guide rail mounted on the privacy screen 102 and a guide rail mounted on the console 103. The seat pan 112 is mounted on these guide rails.

It is also possible to change the height of the seat pan 112 and moveable seat element 120. This is done by the seat pan 112 being mounted on two guide rails; one attached to the privacy screen 102 and one to the side console 103. Hence, the seat 106 can be at a lower height when used as a foot/leg rest (ottoman function) or bed surface and a higher height (also allowing for the reduced height in view of flipping up the moveable seat element 120) for use as a seat for a companion passenger.

Although not shown, the side console 103 provides a table that may be positioned between the two seats 105, 106. Hence, two passengers (one in the main seat 105 and one in the companion seat 106) can dine or work together, facing each other, using the same table.

Although not shown, the companion seat 106 is provided with a seatbelt that a passenger in the companion seat 106 can use, for example during taxi, take-off, landing (TTL) or during turbulence.

Although not shown, there is latch (activated by a handle) that needs to be unlatched prior to the moveable seat element 120 being able to move from the deployed and stowed positions. The moveable seat element 120 can then be moved manually by simply flipping it up or down. A friction mechanism (not shown) allows the seat pan 112 and moveable seat element 120 to stay in a variety of position in between the stowed and deployed configurations.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The storage container 150 provided may be closable, for example using a drawer or flip door.

The companion seat 106 may be additionally provided with a headrest 163. The headrest 163 may be attached to the moveable seat element 120 and may be flipped up (or otherwise deployed) in relation to the moveable seat element 120. The companion seat 106 may comprise a seat belt 161 for use by the companion passenger. This allows the companion passenger to sit in the companion seat 106 during flight (for example, during turbulence) and also, possibly during TTL.

The movement of the arm rests 131, 132 may be controlled using a latch handle.

Alternatively, it may be that movement of the seat pan 112 causes movement of the moveable seat element 120 (rather than the other way round). For example, the seat pan 112 may be caused to slide forwards by pressure being applied to a latch handle (perhaps located towards the front edge 113 of the seat pan 112). When pressure is applied to the latch handle, the seat pan 112 can be slid forwards on the guide rails of the tracking assembly 140. This then causes the angle of the moveable seat element 120 to change and so control the recline angle of the backrest of the companion seat 106. When the user releases the pressure from the latch handle, the position of the seat pan 112 (and moveable seat element 120) is locked (for example, by a clamping mechanism which clamps the seat pan 112 in that position with respect to the guide rails).

An alternative way to adjusting the height of the companion seat 106 is to mount the support structure 111 on a guide rail attached to the privacy screen 102 or console 103. Another alternative is to use a gas strut (like in a configurable office chair) to assist with the height adjustment. A user can press a handle (with no/little weight on the seat 106) to start upward movement (which stops when the handle is released). The user can use the same process (with weight on the seat 106) when the height is to be lowered. A further alternative is to control the height electronically.

The companion seat 106 (seat pan 112 sliding and flipping of moveable seat element 120) may instead may be moveable electronically, using an electrical actuation system.

The cushioning of the companion seat may instead be a non-graphite combustion modified polyurethane foam or a closed cell foam made from PVDF (poly vinylidene fluoride).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft seat unit comprising:
a main seat, and
a companion seat, the main seat and the companion seat facing each other,
wherein the companion seat comprises a seat pan, providing a seat pan surface, a moveable seat element, and a companion seat support structure which supports the seat pan and moveable seat element,
wherein the moveable seat element is rotatable in relation to the seat pan between a stowed position, in which the companion seat provides an additional support surface for a main passenger in the main seat, and a deployed position, in which the moveable seat element provides a backrest surface for a companion passenger in the companion seat, and
wherein the moveable seat element and the seat pan are coupled such that rotation of the moveable seat element from the stowed position to the deployed position causes the seat pan to slide in relation to the companion seat support structure towards the main seat, and such that that rotation of the moveable seat element from the deployed position to the stowed position causes the seat pan to slide in relation to the companion seat support structure away from the main seat,
wherein the moveable seat element is rotatable about a rotation axis adjacent a rear edge of the moveable seat element and adjacent a rear edge of the seat pan surface, and wherein the movable seat element is slidable in a forward and aft direction, and wherein the rotation axis slides with the movable seat element.

2. The aircraft seat unit as claimed in claim 1 wherein, when the moveable seat element is in the stowed position, the additional support surface provided is an additional bed support surface for the main passenger and is in line with an angle of the main seat.

3. The aircraft seat unit as claimed in claim 1, wherein the seat pan surface is at least partially covered by the moveable seat element when the moveable seat element is in its stowed position.

4. The aircraft seat unit as claimed in claim 1, wherein the seat pan surface is uncovered when the moveable seat element is in its deployed position.

5. The aircraft seat unit as claimed in claim 1, wherein the moveable seat element is rotatable about a rotation axis adjacent a rear edge of the moveable seat element.

6. The aircraft seat unit as claimed in claim 5, wherein the rotation axis is also adjacent a rear edge of the seat pan surface.

7. The aircraft seat unit as claimed in claim 6, wherein the seat pan surface is upwardly facing and is angled so that a front edge of the seat pan surface is higher than the rear edge of the seat pan surface.

8. The aircraft seat unit as claimed in claim 7, wherein, when the moveable seat element is in the stowed position, the backrest surface is downwardly facing and is correspondingly angled so as to lie against the seat pan surface.

9. The aircraft seat unit as claimed in claim 8, wherein, when the moveable seat element is in the stowed position, the additional support surface is upwardly facing and is substantially horizontal.

10. The aircraft seat unit as claimed in claim 1, wherein movement of the moveable seat element causes movement of the seat pan and/or movement of the seat pan causes movement of the moveable seat element.

11. The aircraft seat unit as claimed in claim 1, wherein the additional support surface has a first firmness and the seat pan surface has a second, different firmness.

12. The aircraft seat unit as claimed in claim 1, wherein the companion seat comprises at least one moveable arm rest moveable in relation to the moveable seat element between a stowed position and a deployed position, in which the companion seat provides an arm rest support surface for the companion passenger.

13. The aircraft seat unit as claimed in claim 12, wherein the moveable arm rest is rotatable with respect to the moveable seat element.

14. The aircraft seat unit as claimed in claim 13, wherein the moveable arm rest is rotatable about a rotation axis adjacent a rear edge of the moveable arm rest.

15. The aircraft seat unit as claimed in claim 14, wherein the rotation axis is also adjacent the backrest surface.

16. The aircraft seat unit as claimed in claim 12, wherein, in the stowed position, the moveable arm rest lies substantially flush with the backrest surface.

17. The aircraft seat unit as claimed in claim 1, wherein the companion seat comprises at least one moveable head rest moveable in relation to the moveable seat element between a stowed position and a deployed position, in which the companion seat provides a head rest support surface for the companion passenger.

18. The aircraft seat unit as claimed in claim 1, wherein the seat pan of the companion seat is moveable up and down so the height of the additional support surface provided and/or the height of the seat pan surface varies relative to a height of the main seat.

19. The aircraft seat unit as claimed in claim 1, wherein the companion seat comprises a storage container under the moveable seat element.

20. The aircraft seat unit as claimed in claim 1, wherein the companion seat comprises a seat belt for use by the companion passenger.

21. The aircraft seat unit as claimed in claim 1, wherein movement of the moveable seat element between the stowed and deployed positions is mechanically and/or electrically actuated.

22. The aircraft seat unit as claimed in claim 1, wherein the moveable seat element and the seat pan are coupled such that, when the moveable seat element is in the deployed position, sliding movement of the seat pan in relation to the companion seat support structure away from the main seat causes the moveable seat element to rotate from the deployed position to the stowed position.

23. The aircraft unit as claimed in claim 1 further comprising a privacy screen, wherein, when the moveable seat element is in the stowed position, a rear edge of the seat pan and a rear edge of the moveable seat element abut against the privacy screen, and wherein, when the moveable seat element is in the deployed position, a front edge of the moveable seat element abuts against the privacy screen, the front edge of the moveable seat element being located on the opposite side of the moveable seat element to the rear edge.

24. The aircraft unit as claimed in claim 1, wherein the seat pan surface is upwardly facing and is angled so that a front edge of the seat pan surface is higher than the rear edge of the seat pan surface, and wherein a height of the movable seat element is the same as a length of the seat pan surface.

25. The aircraft unit as claimed in claim 1, wherein the seat pan surface is upwardly facing and is angled so that a front edge of the seat pan surface is higher than the rear edge of the seat pan surface, and wherein, in the stowed position, the additional support surface is in line with an angle of the main surface.

26. An aircraft unit as claimed in claim 1, wherein, in the deployed position, the movable seat element extends upwards at an angle relative to a vertical axis.

27. A method of deploying a companion seat, the method comprising the steps of:
providing an aircraft unit with a main seat and the companion seat, the main and companion seats facing each other,
moving a moveable seat element of the companion seat in relation to a seat pan, providing a seat pan surface of the companion seat, from a stowed position, in which the companion seat provides an additional support surface for a main passenger in the main seat, and a deployed position, in which the moveable seat element provides a backrest surface for a companion passenger in the companion seat, wherein the moveable seat element is rotatable about a rotation axis adjacent a rear edge of the moveable seat element and adjacent a rear edge of the seat pan surface, wherein the movable seat element is slidable in a forward and aft direction relative to the main seat, and wherein the rotation axis slides with the movable seat element.

28. A method of stowing a companion seat, the method comprising the steps of:
providing an aircraft unit with a main seat and the companion seat, the main and companion seats facing each other, moving a moveable seat element of the companion seat in relation to a seat pan, providing a seat pan surface of the companion seat, from a deployed position, in which the moveable seat element provides a backrest surface for a companion passenger in the companion seat and a stowed position, in which the companion seat provides an additional support surface for a main passenger in the main seat, wherein the moveable seat element is rotatable about a rotation axis adjacent a rear edge of the moveable seat element and adjacent a rear edge of the seat pan surface, wherein the movable seat element is slidable in a forward and aft direction relative to the main seat, and wherein the rotation axis slides with the movable seat element.

\* \* \* \* \*